US012561958B2

(12) United States Patent
Yeo et al.

(10) Patent No.: US 12,561,958 B2
(45) Date of Patent: Feb. 24, 2026

(54) METHOD OF TRAINING SEMICONDUCTOR PROCESS IMAGE GENERATOR

(71) Applicant: Samsung Electronics Co., Ltd., Suwon-si (KR)

(72) Inventors: Sangchul Yeo, Osan-si (KR); Jaewon Yang, Suwon-si (KR); Hyeok Lee, Suwon-si (KR); Sooryong Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 720 days.

(21) Appl. No.: 17/820,911

(22) Filed: Aug. 19, 2022

(65) Prior Publication Data

US 2023/0177815 A1 Jun. 8, 2023

(30) Foreign Application Priority Data

Dec. 6, 2021 (KR) ........................ 10-2021-0173176

(51) Int. Cl.
*G06V 10/776* (2022.01)
*G06T 3/60* (2024.01)
*G06V 10/774* (2022.01)

(52) U.S. Cl.
CPC .............. *G06V 10/776* (2022.01); *G06T 3/60* (2013.01); *G06V 10/774* (2022.01)

(58) Field of Classification Search
CPC .... G06V 10/776; G06V 10/774; G06V 10/24; G06V 10/242; G06T 3/60; G06N 3/094; G06N 3/0464; G06N 3/0475; G03F 7/00; G03F 7/705
See application file for complete search history.

(56) References Cited

U.S. PATENT DOCUMENTS

| | | | | |
|---|---|---|---|---|
| 6,187,483 B1 * | 2/2001 | Capodieci | ................. | G03F 1/36 |
| | | | | 716/54 |
| 6,883,158 B1 * | 4/2005 | Sandstrom | .......... | G03F 7/70616 |
| | | | | 700/121 |
| 8,479,125 B2 * | 7/2013 | Pierrat | ................ | G03F 7/70125 |
| | | | | 716/54 |
| 10,282,509 B2 * | 5/2019 | Watanabe | ............. | G03F 7/7065 |
| 10,289,008 B2 * | 5/2019 | Jak | ......................... | G03F 9/7088 |
| 10,552,714 B2 | 2/2020 | Kiapour et al. | | |
| 10,657,213 B2 * | 5/2020 | Ungar | ..................... | G06F 30/39 |

(Continued)

FOREIGN PATENT DOCUMENTS

| | | | | | |
|---|---|---|---|---|---|
| CN | 110945528 A | * | 3/2020 | ............... | G06N 3/08 |
| CN | 111833239 A | * | 10/2020 | ............... | G06T 3/40 |

(Continued)

*Primary Examiner* — Stephen R Koziol
*Assistant Examiner* — Benedict E Lee
(74) *Attorney, Agent, or Firm* — Wolf, Greenfield & Sacks, P.C.

(57) ABSTRACT

A method of training a semiconductor process image generator includes training the semiconductor process image generator with a plurality of mask images including a first group and a second group, training the semiconductor process image generator with the second group and a first transformed group obtained by applying a transformation to the first group, and training the semiconductor process image generator with the first group and a second transformed group obtained by applying a transformation to the second group.

20 Claims, 13 Drawing Sheets

100

(56)                References Cited

U.S. PATENT DOCUMENTS

| | | | |
|---|---|---|---|
| 10,706,200 B2 | 7/2020 | Sha et al. | |
| 10,803,355 B2 * | 10/2020 | Lin | G06N 3/08 |
| 10,877,381 B2 * | 12/2020 | Kou | G03F 7/70616 |
| 10,909,421 B2 * | 2/2021 | Liu | G06F 18/24 |
| 10,948,831 B2 * | 3/2021 | Luo | G06V 10/764 |
| 11,195,265 B2 * | 12/2021 | Kim | G06T 3/60 |
| 11,506,566 B2 * | 11/2022 | Medvedyeva | G03F 7/70633 |
| 11,561,477 B2 * | 1/2023 | Su | G03F 7/70441 |
| 11,727,670 B2 * | 8/2023 | Hida | G06N 3/0475 |
| 11,815,468 B2 * | 11/2023 | Kuno | G01N 21/8851 |
| 11,966,166 B2 * | 4/2024 | Bijnen | G03F 7/705 |
| 12,001,145 B2 * | 6/2024 | Freytag | G06N 20/00 |
| 12,056,431 B2 * | 8/2024 | Yu | G03F 7/70441 |
| 12,254,392 B2 * | 3/2025 | Hasibi | G06F 30/398 |
| 2020/0285894 A1 | 9/2020 | El-Khamy et al. | |
| 2020/0356011 A1 | 11/2020 | Su et al. | |
| 2021/0216697 A1 * | 7/2021 | Van Den Brink | G06F 30/398 |
| 2021/0374936 A1 * | 12/2021 | Koopman | G06F 18/2431 |
| 2021/0407072 A1 * | 12/2021 | Ben Baruch | G06V 20/52 |
| 2022/0028052 A1 | 1/2022 | Li et al. | |
| 2022/0291593 A1 * | 9/2022 | Werkman | G03F 7/705 |
| 2022/0335290 A1 * | 10/2022 | Pisarenco | G06N 3/0475 |
| 2022/0375063 A1 * | 11/2022 | Pisarenco | G06N 3/094 |
| 2024/0029410 A1 * | 1/2024 | Chen | G06V 10/82 |
| 2024/0185582 A1 * | 6/2024 | Bozorgtabar | G06N 3/0464 |

FOREIGN PATENT DOCUMENTS

| | | | | | |
|---|---|---|---|---|---|
| CN | 108648197 B | * | 9/2021 | | G06N 3/045 |
| KR | 1020200035303 A | | 4/2020 | | |
| KR | 1020200075050 A | | 6/2020 | | |
| KR | 1020200107755 A | | 9/2020 | | |
| KR | 1020200113244 A | | 10/2020 | | |
| KR | 1020210010897 A | | 1/2021 | | |
| KR | 1020210033496 A | | 3/2021 | | |
| KR | 1020210090253 A | | 7/2021 | | |
| TW | 1731303 B | * | 6/2021 | | G06N 3/08 |
| TW | 202134796 A | * | 9/2021 | | G06V 10/82 |
| WO | WO-2021096191 A1 | * | 5/2021 | | G06T 11/00 |

* cited by examiner

Figure 9:
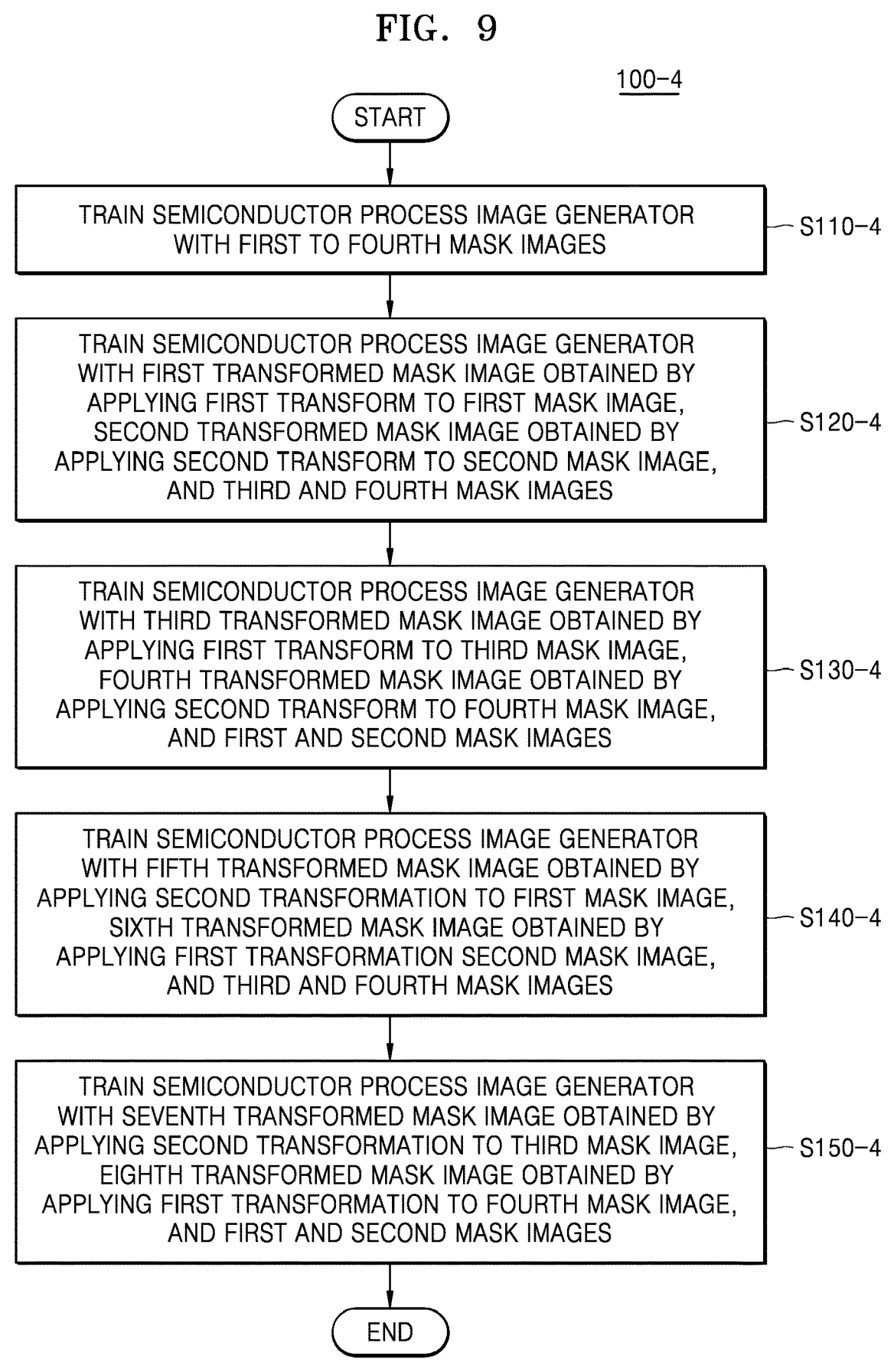

START

TRAIN SEMICONDUCTOR PROCESS IMAGE GENERATOR
WITH FIRST TO FOURTH MASK IMAGES ⎯ S110-4

TRAIN SEMICONDUCTOR PROCESS IMAGE GENERATOR
WITH FIRST TRANSFORMED MASK IMAGE OBTAINED BY
APPLYING FIRST TRANSFORM TO FIRST MASK IMAGE,
SECOND TRANSFORMED MASK IMAGE OBTAINED BY
APPLYING SECOND TRANSFORM TO SECOND MASK IMAGE,
AND THIRD AND FOURTH MASK IMAGES ⎯ S120-4

TRAIN SEMICONDUCTOR PROCESS IMAGE GENERATOR
WITH THIRD TRANSFORMED MASK IMAGE OBTAINED BY
APPLYING FIRST TRANSFORM TO THIRD MASK IMAGE,
FOURTH TRANSFORMED MASK IMAGE OBTAINED BY
APPLYING SECOND TRANSFORM TO FOURTH MASK IMAGE,
AND FIRST AND SECOND MASK IMAGES ⎯ S130-4

TRAIN SEMICONDUCTOR PROCESS IMAGE GENERATOR
WITH FIFTH TRANSFORMED MASK IMAGE OBTAINED BY
APPLYING SECOND TRANSFORMATION TO FIRST MASK IMAGE,
SIXTH TRANSFORMED MASK IMAGE OBTAINED BY
APPLYING FIRST TRANSFORMATION SECOND MASK IMAGE,
AND THIRD AND FOURTH MASK IMAGES ⎯ S140-4

TRAIN SEMICONDUCTOR PROCESS IMAGE GENERATOR
WITH SEVENTH TRANSFORMED MASK IMAGE OBTAINED BY
APPLYING SECOND TRANSFORMATION TO THIRD MASK IMAGE,
EIGHTH TRANSFORMED MASK IMAGE OBTAINED BY
APPLYING FIRST TRANSFORMATION TO FOURTH MASK IMAGE,
AND FIRST AND SECOND MASK IMAGES ⎯ S150-4

END

Figure 11:
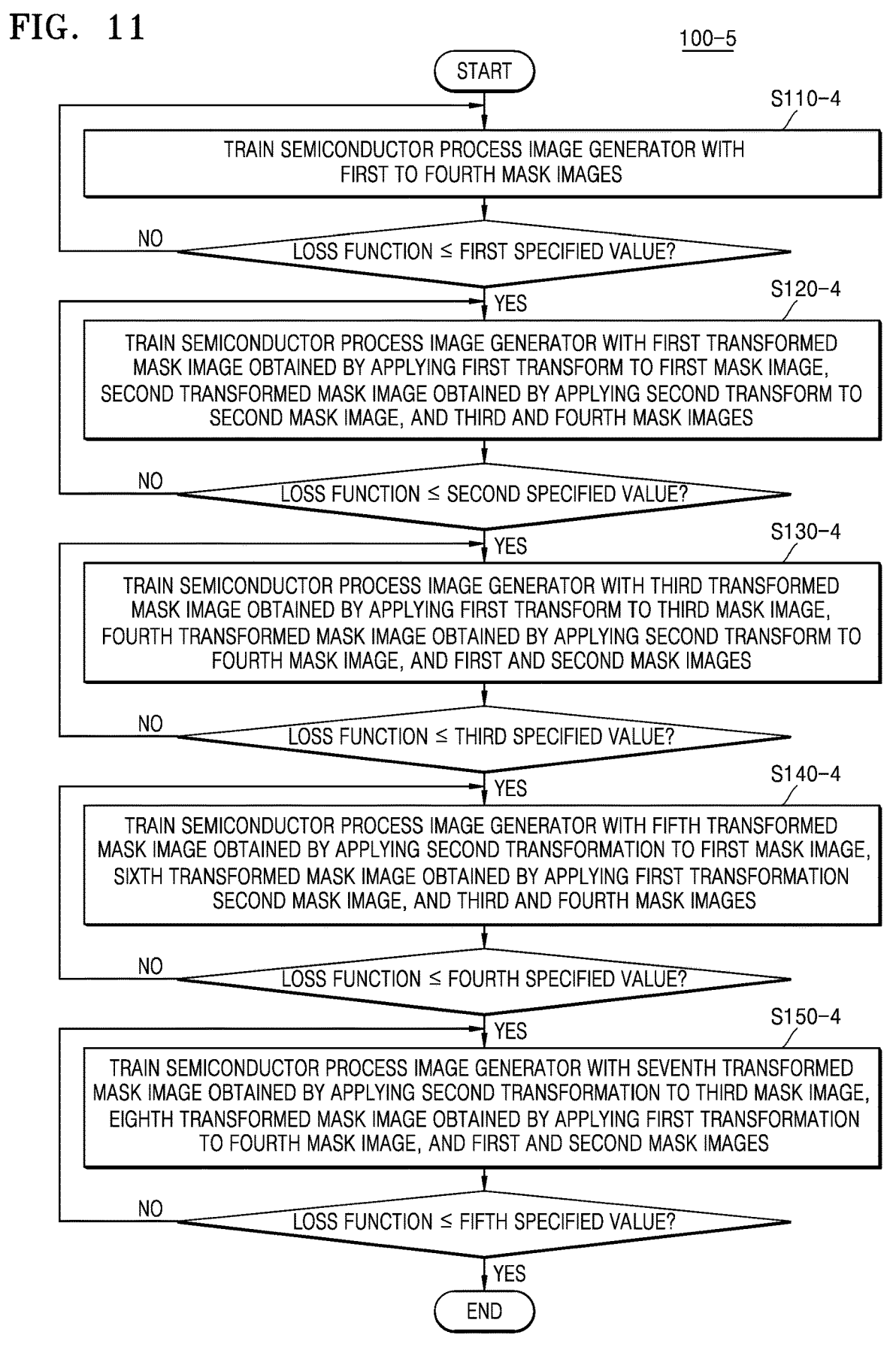

START

S110-4

TRAIN SEMICONDUCTOR PROCESS IMAGE GENERATOR WITH
FIRST TO FOURTH MASK IMAGES

NO     LOSS FUNCTION ≤ FIRST SPECIFIED VALUE?

YES     S120-4

TRAIN SEMICONDUCTOR PROCESS IMAGE GENERATOR WITH FIRST TRANSFORMED
MASK IMAGE OBTAINED BY APPLYING FIRST TRANSFORM TO FIRST MASK IMAGE,
SECOND TRANSFORMED MASK IMAGE OBTAINED BY APPLYING SECOND TRANSFORM TO
SECOND MASK IMAGE, AND THIRD AND FOURTH MASK IMAGES

NO     LOSS FUNCTION ≤ SECOND SPECIFIED VALUE?

YES     S130-4

TRAIN SEMICONDUCTOR PROCESS IMAGE GENERATOR WITH THIRD TRANSFORMED
MASK IMAGE OBTAINED BY APPLYING FIRST TRANSFORM TO THIRD MASK IMAGE,
FOURTH TRANSFORMED MASK IMAGE OBTAINED BY APPLYING SECOND TRANSFORM TO
FOURTH MASK IMAGE, AND FIRST AND SECOND MASK IMAGES

NO     LOSS FUNCTION ≤ THIRD SPECIFIED VALUE?

YES     S140-4

TRAIN SEMICONDUCTOR PROCESS IMAGE GENERATOR WITH FIFTH TRANSFORMED
MASK IMAGE OBTAINED BY APPLYING SECOND TRANSFORMATION TO FIRST MASK IMAGE,
SIXTH TRANSFORMED MASK IMAGE OBTAINED BY APPLYING FIRST TRANSFORMATION
SECOND MASK IMAGE, AND THIRD AND FOURTH MASK IMAGES

NO     LOSS FUNCTION ≤ FOURTH SPECIFIED VALUE?

YES     S150-4

TRAIN SEMICONDUCTOR PROCESS IMAGE GENERATOR WITH SEVENTH TRANSFORMED
MASK IMAGE OBTAINED BY APPLYING SECOND TRANSFORMATION TO THIRD MASK IMAGE,
EIGHTH TRANSFORMED MASK IMAGE OBTAINED BY APPLYING FIRST TRANSFORMATION
TO FOURTH MASK IMAGE, AND FIRST AND SECOND MASK IMAGES

NO     LOSS FUNCTION ≤ FIFTH SPECIFIED VALUE?

YES

END

FIG. 12

METHOD OF TRAINING SEMICONDUCTOR PROCESS IMAGE GENERATOR

CROSS-REFERENCE TO RELATED APPLICATION

This application is based on and claims priority under 35 U.S.C. § 119 to Korean Patent Application No. 10-2021-0173176, filed on Dec. 6, 2021, in the Korean Intellectual Property Office, the disclosure of which is incorporated by reference herein in its entirety.

BACKGROUND

The inventive concept relates to a method of training a semiconductor process image generator. More specifically, the inventive concept relates to a method of training a semiconductor process image generator by using deep learning.

Recently, there has been proposed a method of modeling a semiconductor process model by using deep learning with the development of deep learning technology. However, the deep learning technology does not recognize rotation and symmetry transformations of input images. Accordingly, when modeling a semiconductor process model with deep learning technology, it is necessary to learn not only input images but also transformed images obtained by applying rotation and/or symmetry transformations to the input images. Therefore, it takes a long time to train the semiconductor process because the number of images used to train the semiconductor process is large.

SUMMARY

The inventive concept provides a method of training a semiconductor process image generator that trains rotation and/or symmetry transformations of input images in a short time.

According to an aspect of the inventive concept, a method of training a semiconductor process image generator may include training the semiconductor process image generator with a plurality of mask images including a first group and a second group, training the semiconductor process image generator with the second group and a first transformed group obtained by applying a transformation to the first group, and training the semiconductor process image generator with the first group and a second transformed group obtained by applying a transformation to the second group.

According to another aspect of the inventive concept, a method of training a semiconductor process image generator may include training the semiconductor process image generator with a plurality of mask images, training the semiconductor process image generator with a first transformed group and a first remaining group of the plurality of mask images, wherein the first transformed group is obtained by applying a first transformation to a first group of the plurality of mask images, and training the semiconductor process image generator with a second transformed group and a second remaining group of the plurality of mask images, wherein the second transformed group is obtained by applying a second transformation to a second group of the plurality of mask images, and a number of transformed mask images in the second transformed group may be less than a number of transformed mask images in the first transformed group.

According to another aspect of the inventive concept, a method of training a semiconductor process image generator may include training the semiconductor process image generator with first to fourth mask images, training the semiconductor process image generator with the third mask image, the fourth mask image, a first transformed mask image obtained by applying a first transformation to the first mask image, and a second transformed mask image obtained by applying a second transformation to the second mask image, training the semiconductor process image generator with the first mask image, the second mask image, a third transformed mask image obtained by applying the first transformation to the third mask image, and a fourth transformed mask image obtained by applying the second transformation to the fourth mask image, training the semiconductor process image generator with the third mask image, the fourth mask image, a fifth transformed mask image obtained by applying the second transformation to the first mask image, and a sixth transformed mask image obtained by applying the first transformation to the second mask image, and training the semiconductor process image generator with the first mask image, the second mask image, a seventh transformed mask image obtained by applying the second transformation to the third mask image, and an eighth transformed mask image obtained by applying the first transformation to the fourth mask image.

BRIEF DESCRIPTION OF THE DRAWINGS

Embodiments of the inventive concept will be more clearly understood from the following detailed description taken in conjunction with the accompanying drawings in which:

FIG. 4 illustrates transformations according to an embodiment of the inventive concept;

FIG. 9 is a flowchart illustrating a method of training a semiconductor process image generator, according to an embodiment of the inventive concept;

FIG. 11 is a flowchart illustrating a method of training a semiconductor process image generator, according to an embodiment of the inventive concept; and FIG. 12 is a diagram illustrating an operation for training a semiconductor process image generator with a plurality of mask images.

DETAILED DESCRIPTION OF THE EMBODIMENTS

Figure 1:
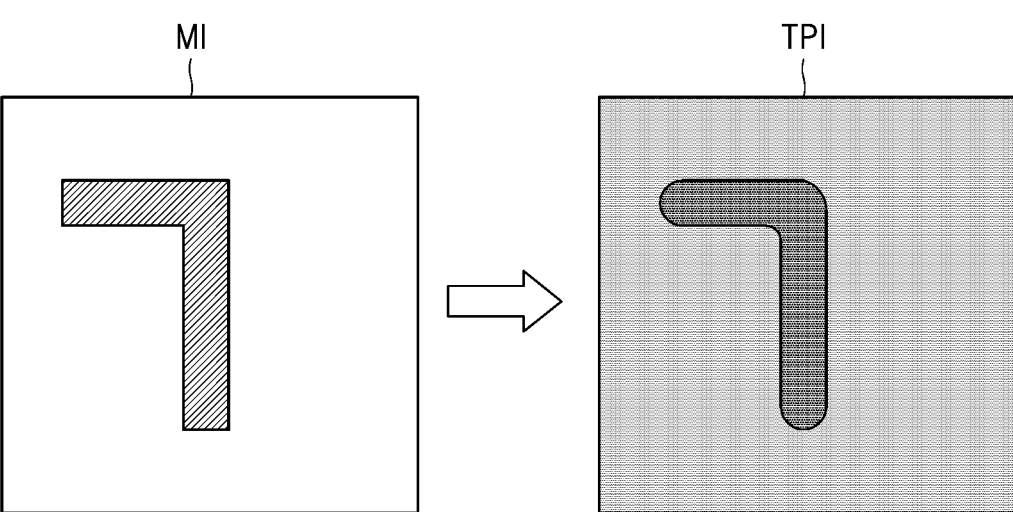
FIG. 1 illustrates a relationship between a mask image and an actual semiconductor process image.

FIG. 1 illustrates a relationship between a mask image MI and an actual semiconductor process image TPI.

Referring to FIG. 1, a semiconductor process may be performed with a mask during a lithography process. The mask may include a portion that transmits light therethrough and a portion that does not transmit light therethrough. The mask selectively transmits light therethrough, and the transmitted light may be incident on a photosensitive material on a substrate. Accordingly, there may be a difference in solubility in a developer between a light-exposed portion of a photosensitive material and a light-unexposed portion thereof. Accordingly, only the light-exposed portion or the light-unexposed portion of the photosensitive material may remain (e.g., be left by the developer). Thereafter, a substrate or a material layer between the substrate and a photosensitive material may be patterned by etching the substrate or the material layer between the substrate and the photosensitive material with the remaining portion of the photosensitive material as an etching mask.

The mask image MI illustrated in FIG. 1 may include an image of a mask used in a lithography process, and the actual semiconductor process image TPI may include an image obtained by imaging a result of the lithography process using a mask. As illustrated in FIG. 1, the mask image MI is different from the actual semiconductor process image TPI. For example, a corner of a pattern of the mask image MI may be sharper than a corner of a pattern of the semiconductor process image TPI. This is because a pattern of a mask is not directly transferred to a substrate or a material layer on the substrate due to an optical effect. A semiconductor process image generator according to an embodiment of the inventive concept may simulate the actual semiconductor process image TPI from the mask image MI. That is, the semiconductor process image generator may generate a semiconductor process image from the mask image MI, and the generated semiconductor process image may be similar to the actual semiconductor process image TPI.

Figure 2:
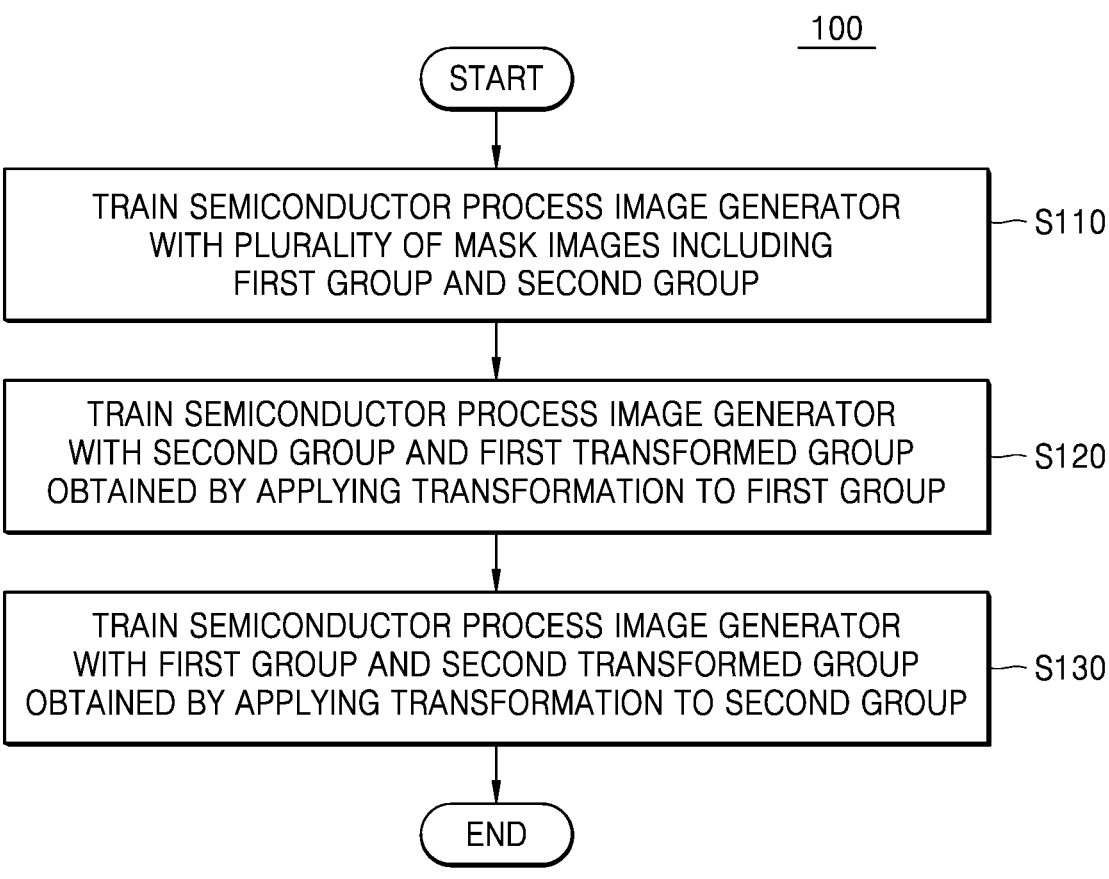
FIG. 2 is a flowchart illustrating a method of training a semiconductor process image generator, according to an embodiment of the inventive concept.
Figure 3:
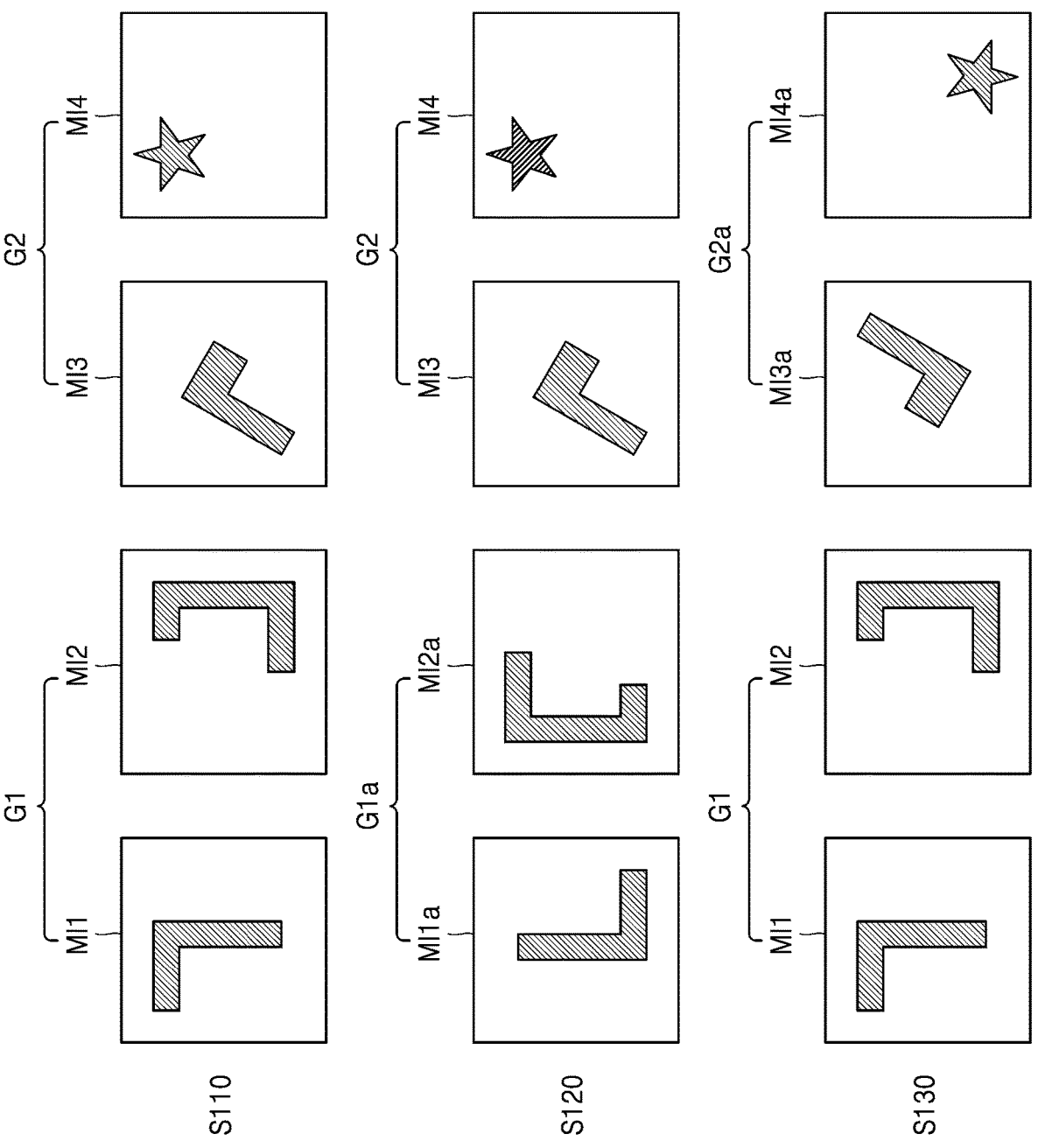
FIG. 3 illustrates a method of training a semiconductor process image generator, according to an embodiment of the inventive concept.
Figure 4:
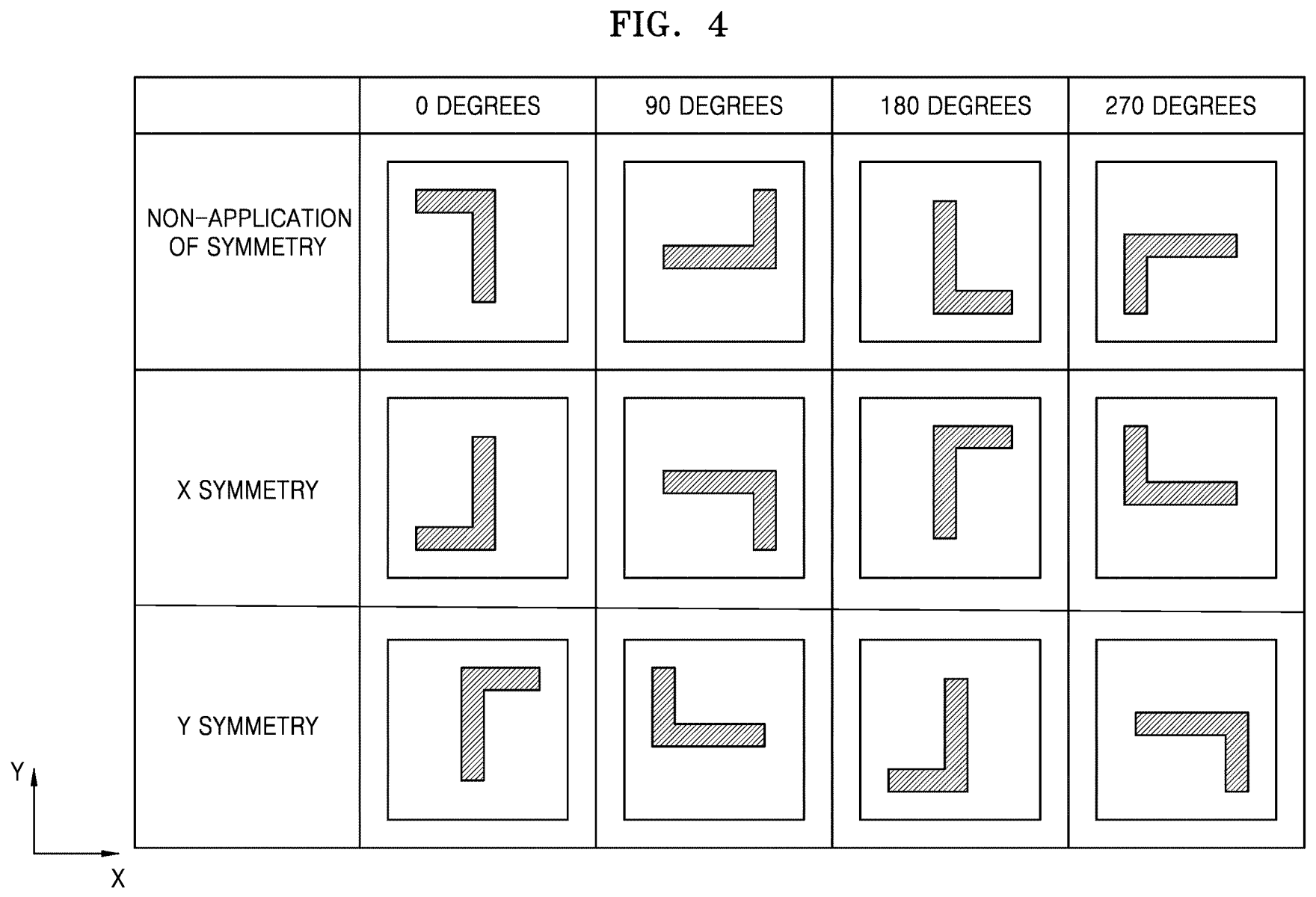

FIG. 2 is a flowchart illustrating a method 100 of training a semiconductor process image generator, according to an embodiment of the inventive concept. FIG. 3 illustrates the method 100 of training a semiconductor process image generator, according to the embodiment of the inventive concept. FIG. 4 illustrates transformations according to an embodiment of the inventive concept.

Referring to FIGS. 2 to 4, the semiconductor process image generator may be trained with first to fourth mask images MI1 to MI4 including a first group G1 and a second group G2 (S110). For example, the first group G1 may include first and second mask images MI1 and MI2, and the second group G2 may include third and fourth mask images MI3 and MI4. The first to fourth mask images MI1 to MI4 are examples, and the number of images of a mask used in operation S110 for training a semiconductor process image generator is not limited to 4.

Next, the semiconductor process image generator may be trained with the second group G2 and a first transformed group G1a obtained by applying a transformation to the first group G1 (S120). For example, the first transformed group G1a may include first and second transformed mask images MI1a and MI2a.

Here, the transformation may include a rotation transformation, a symmetry transformation, or a combination of the rotation transformation and the symmetry transformation, as illustrated in FIG. 4. The rotation transformation may include a 90 degree rotation transformation, a 180 degree rotation transformation, and a 270 degree rotation transformation. The symmetry transformation may include an X-axis symmetry transformation and a Y-axis symmetry transformation. Therefore, a transformation may include, for example, a 90 degree rotation transformation, a 180 degree rotation transformation, a 270 degree rotation transformation, an X-axis symmetry transformation, a Y-axis symmetry transformation, a combination of the X-axis symmetry transformation and the 90 degree rotation transformation, a combination of the X-axis symmetry transformation and the 180 degree rotation transformation, a combination of the X-axis symmetry transformation and the 270 degree rotation transformation, a combination of the Y-axis symmetry transformation and the 90 degree rotation transformation, a combination of the Y-axis symmetry transformation and the 180 degree rotation transformation, or a combination of the Y-axis symmetry transformation and the 270 degree rotation transformation. The first and second transformed mask images MI1a and MI2a may be obtained by respectively applying the same transformations, for example, a 180 degree rotation transformation, to the first and second mask images MI1 and MI2.

Next, the semiconductor process image generator may be trained with the first group G1 and a second transformed group G2a obtained by applying a transformation to the second group G2 (S130). The second transformed group G2a may include third and fourth transformed mask images MI3a and MI4a. The third and fourth transformed mask images MI3a and MI4a may be obtained by respectively applying the same transformations, for example, a 180 degree rotation transformation, to the third and fourth mask images MI3 and MI4.

Of course, additional operations may be performed to train other transforms. For example, an operation for training the semiconductor process image generator with the second group G2 and a third transformed group obtained by applying another transformation to the first group G1, and an operation for training the semiconductor process image generator with the first group G1 and a fourth transformed group obtained by applying another transformation to the second group G2 may be further performed.

The method 100 of training a semiconductor process image generator, according to the embodiment of the inventive concept, may quickly train the semiconductor process image generator for rotation and/or symmetry transformation. In a general data augmentation technique, images transformed by applying rotation and/or symmetric transformation to input images may be trained by the same number of times as the input images. However, according to the inventive concept, the input images may be trained more times than the transformed images. By training a semiconductor process image generator with first input images and then training the transformed images together with the input images, a training speed may be increased and a loss function of the semiconductor process image generator may quickly converge. Accordingly, functioning of a semiconductor process image generator that is used to simulate semiconductor process images may be improved according to the present inventive concept, for example by training the semiconductor process image generator with a plurality of mask images including a first group and a second group, then training the semiconductor process image generator with the second group and a first transformed group obtained by applying a transformation to the first group, and training the semiconductor process image generator with the first group and a second transformed group obtained by applying a transformation to the second group.

In some embodiments, operation S110 for training a semiconductor process image generator with the first to fourth mask images MI1 to MI4 may be repeated n1 times. In addition, operation S120 for training the semiconductor process image generator with the first transformed group G1$a$ and the second group G2 may be repeated n2 times. In addition, operation S130 for training the semiconductor process image generator with the second transformed group G2$a$ and the first group G1 may be repeated n3 times. The number n2 may be less than or equal to n1, and n3 may be less than or equal to n1. By gradually reducing the number of iterations, a loss function of the semiconductor process image generator may quickly converge.

For example, operation S110 for training a semiconductor process image generator with a plurality of mask images, operation S120 for training the semiconductor process image generator with the first transformed group G1$a$ and the second group G2, and operation S130 for training the semiconductor process image generator with the second transformed group G2$a$ and the first group G1 may be performed only once.

For example, in one embodiment, operation S110 for training a semiconductor process image generator with a plurality of mask images may be repeated four times, and each of operation S120 for training the semiconductor process image generator with the first transformed group G1$a$ and the second group G2 and operation S130 for training the semiconductor process image generator with the second transformed group G2$a$ and the first group G1 may be repeated twice.

For example, in one embodiment, operation S110 for training a semiconductor process image generator with a plurality of mask images may be repeated four times, operation S120 for training the semiconductor process image generator with the first transformed group G1$a$ and the second group G2 may be repeated three times, and operation S130 for training the semiconductor process image generator with the second transformed group G2$a$ and the first group G1 may be repeated twice.

Figure 5:
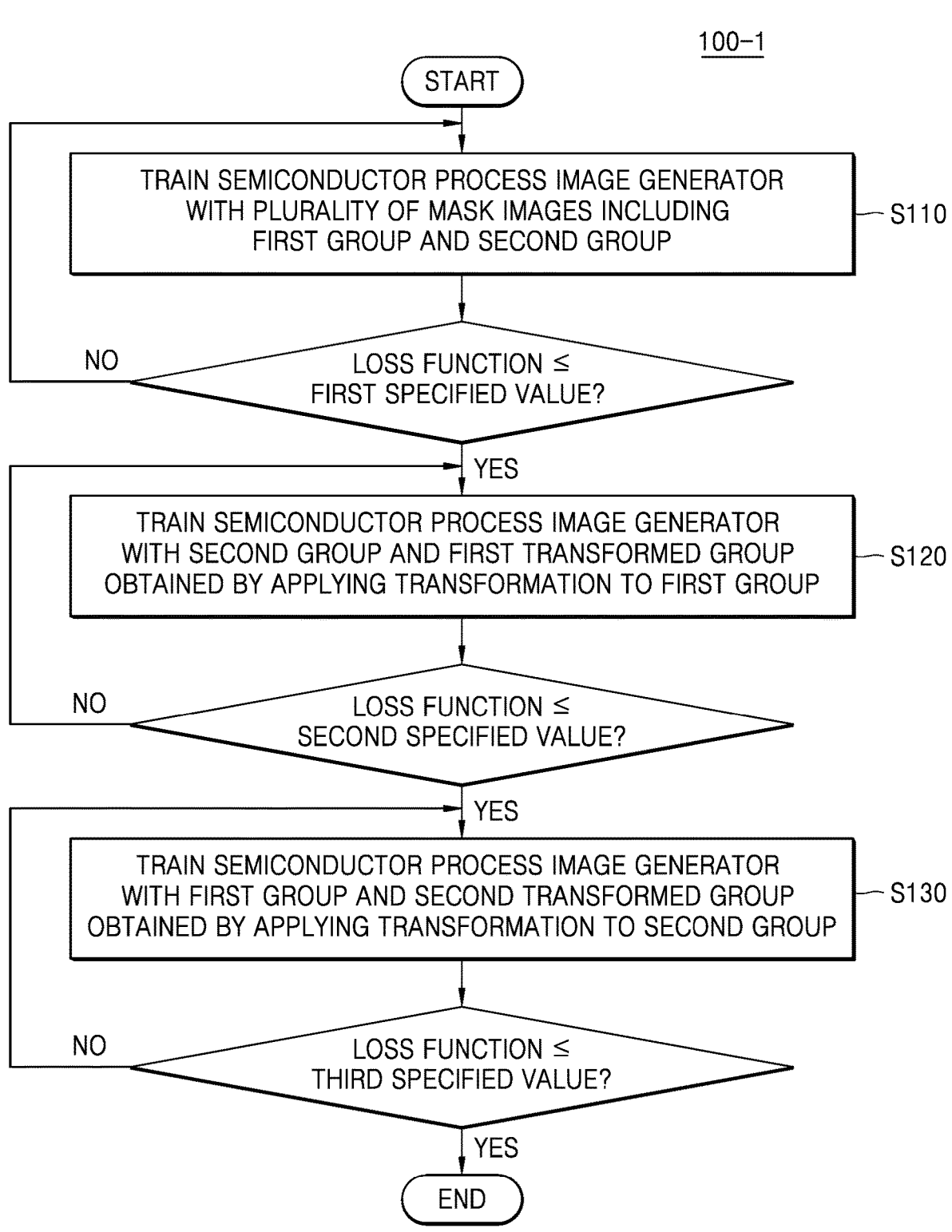
FIG. 5 is a flowchart illustrating a method of training a semiconductor process image generator, according to an embodiment of the inventive concept.

FIG. 5 is a flowchart illustrating a method 100-1 of training a semiconductor process image generator, according to an embodiment of the inventive concept. A difference between the method 100 of training a semiconductor process image generator illustrated in FIG. 2 and the method 100-1 of training a semiconductor process image generator illustrated in FIG. 5 is described below.

Referring to FIGS. 5 and 3, a semiconductor process image generator may be trained with the first to fourth mask images MI1 to MI4 including the first group G1 and the second group G2 (S110). An operation for training a semiconductor process image generator with the first to fourth mask images MI1 to MI4 may be repeated until a loss function of the semiconductor process image generator is less than or equal to a first value.

Next, a semiconductor process image generator may be trained with the first transformed group G1$a$ and the second group G2 (S120), and operation S120 for training the semiconductor process image generator with the first transformed group G1$a$ and the second group G2 may be repeated until a loss function of the semiconductor process image generator is less than or equal to a second value.

Next, a semiconductor process image generator may be trained with the second transformed group G2$a$ and the first group G1 (S130). Operation S130 for training the semiconductor process image generator with the second transformed group G2$a$ and the first group G1 may be repeated until a loss function of the semiconductor process image generator is less than or equal to a third value.

The second value may be less than or equal to the first value, and the third value may be less than or equal to the first value. For example, the second value may be less than the first value, and the third value may be less than the second value.

Figure 6:
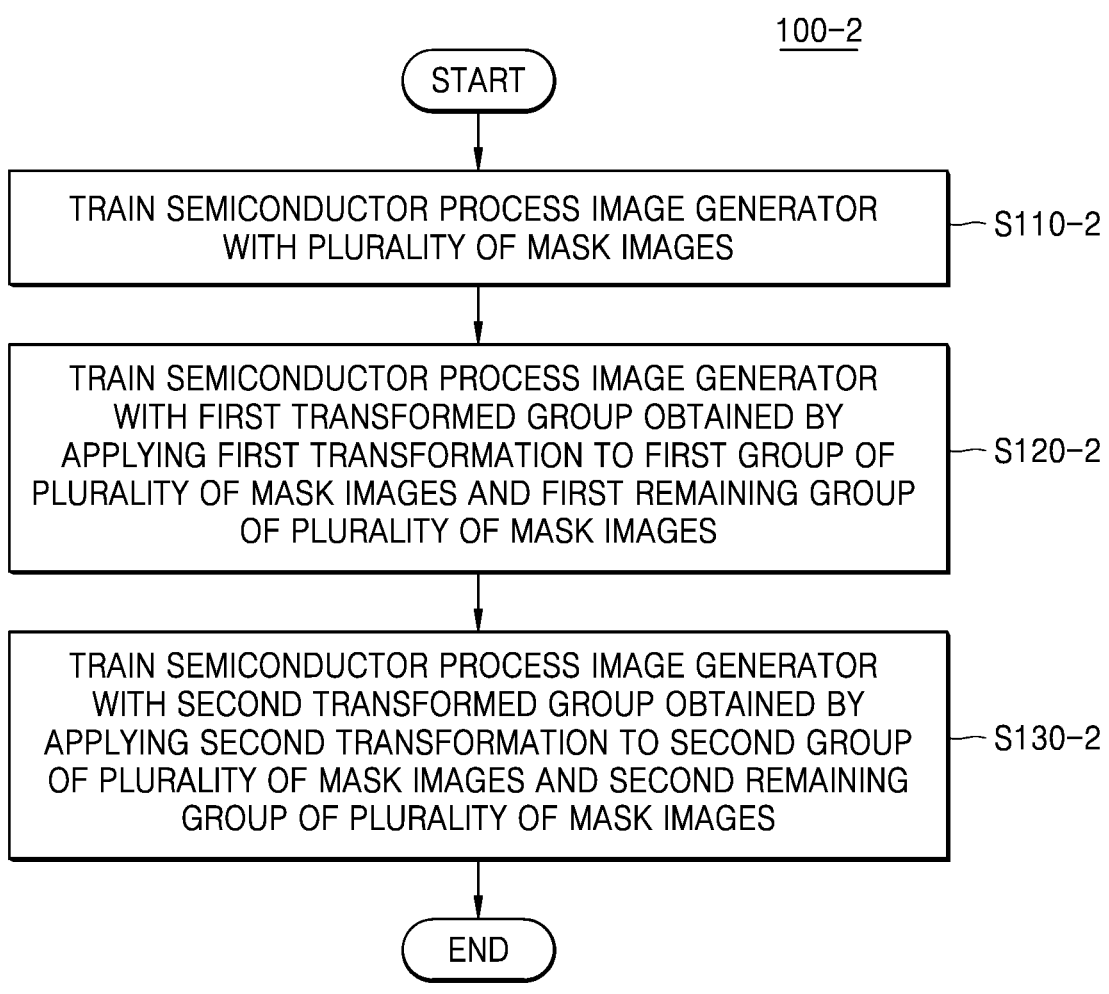
FIG. 6 is a flowchart illustrating a method of training a semiconductor process image generator, according to an embodiment of the inventive concept.
Figure 7:
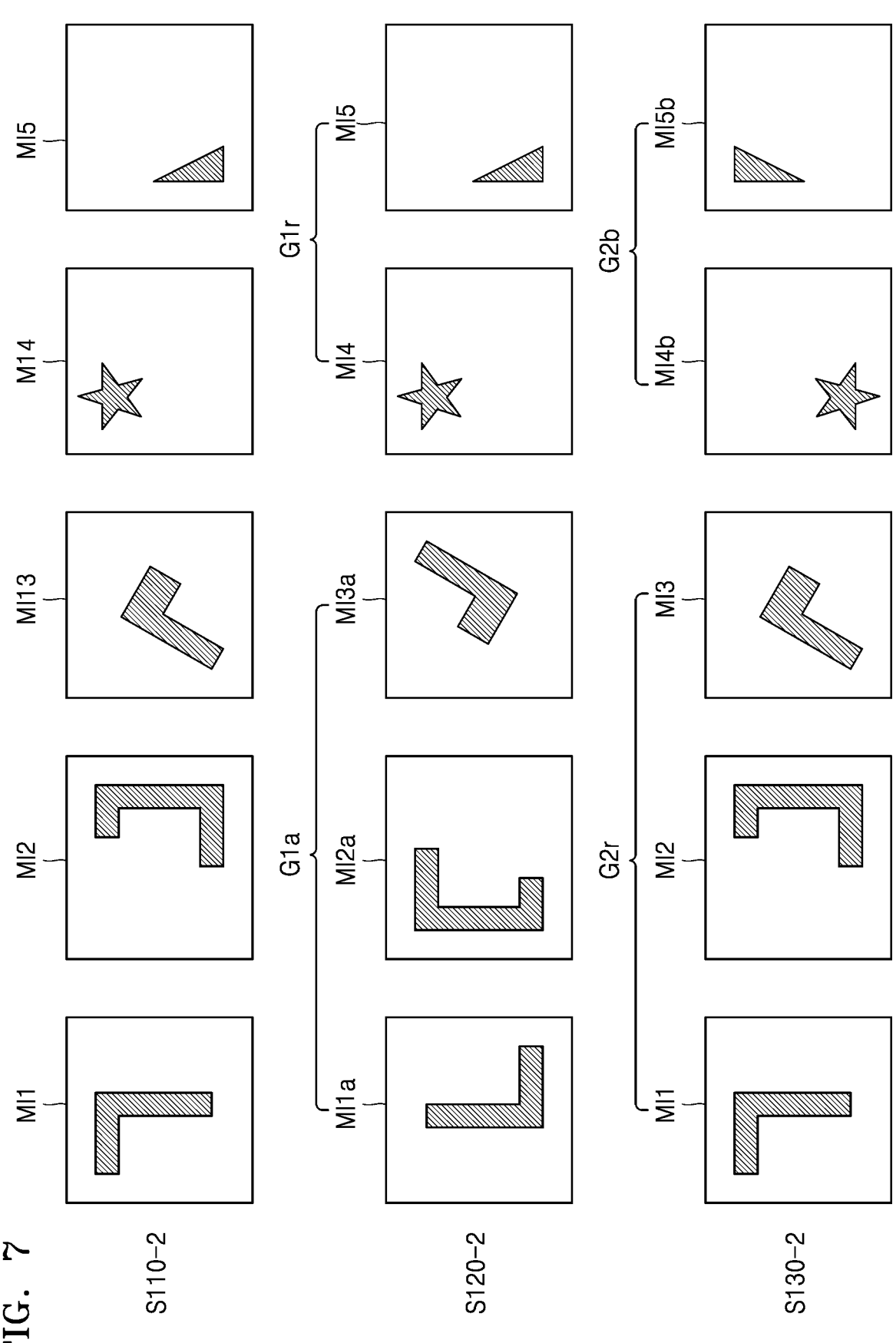
FIG. 7 illustrates a method of training a semiconductor process image generator, according to an embodiment of the inventive concept.

FIG. 6 is a flowchart illustrating a method 100-2 of training a semiconductor process image generator, according to an embodiment of the inventive concept. FIG. 7 illustrates the method 100-2 of training a semiconductor process image generator, according to an embodiment of the inventive concept.

Referring to FIGS. 6 and 7, a semiconductor process image generator may be trained with a first mask image MI1 to a fifth mask image MI5 (S110-2).

Next, the semiconductor process image generator may be trained with a first remaining group G1$r$ and the first transformed group G1$a$ obtained by applying a first transformation to the first group (S120-2). The first group G1 may include the first to third mask images MI1 to MI3, and the first transformed group G1$a$ may include first to third transformed mask images MI1$a$ to MI3$a$ obtained by applying the first transformation, for example, a 180 degree rotation transformation, to each of the first to third mask images MI1 to MI3. The first remaining group G1$r$ may include the fourth and fifth mask images MI4 and MI5 excluding the first group from the first to fifth mask images MI1 to MI5.

Next, a semiconductor process image generator may be trained with a second remaining group G2$r$ and the second transformed group G2$b$ obtained by applying a second transformation to the second group (S130-2). The second group G2 may include the fourth and fifth mask images MI4 and MI5, and the second transformed group G2$b$ may include the fourth transformed mask image MI3$a$ to a fifth transformed mask image MI5$a$ obtained by applying a second transformation, for example, an X-axis symmetry transformation, to each of the fourth and fifth mask images MI4 and MI5. In the embodiment of FIG. 7, the first group G1 does not overlap the second group G2, but in some embodiments, the first group G1 may overlap the second group G2. For example, the first group G1 may include three mask images randomly selected from the first to fifth mask images MI1 to MI5, and the second group G2 may include two mask images randomly selected from the first to fifth mask images MI1 to MI5. The second remaining group G2$r$ may include mask images in the first to fifth mask images MI1 to MI5, excluding the second group G2. For example, the second remaining group G2$r$ may include the first to third mask images MI1 to MI3. The number (2 in the embodiment of FIG. 7) of transformed mask images in the second transformed group G2$b$ may be less than the number (3 in the embodiment of FIG. 7) of transformed mask images in the first transformed group G1$a$.

In FIG. 7, the number of mask images used in operation S110-2 of training a semiconductor process image generator with the first to fifth mask images MI1 to MI5 is 5, the number of mask images in the first group is 3, and the number of mask images in the second group is 2; however, the numbers discussed are examples and may be changed.

In some embodiments, operation S110-2 for training a semiconductor process image generator with the first to fourth mask images MI1 to MI4 may be repeated n1 times. In addition, operation S120-2 for training the semiconductor process image generator with the first transformed group G1a and the first remaining group G1r may be repeated n2 times. In addition, operation S130-2 for training the semiconductor process image generator with the second transformed group G2a and the second remaining group G2r may be repeated n3 times. n2 may be less than or equal to n1, and n3 may be less than or equal to n2.

Figure 8:
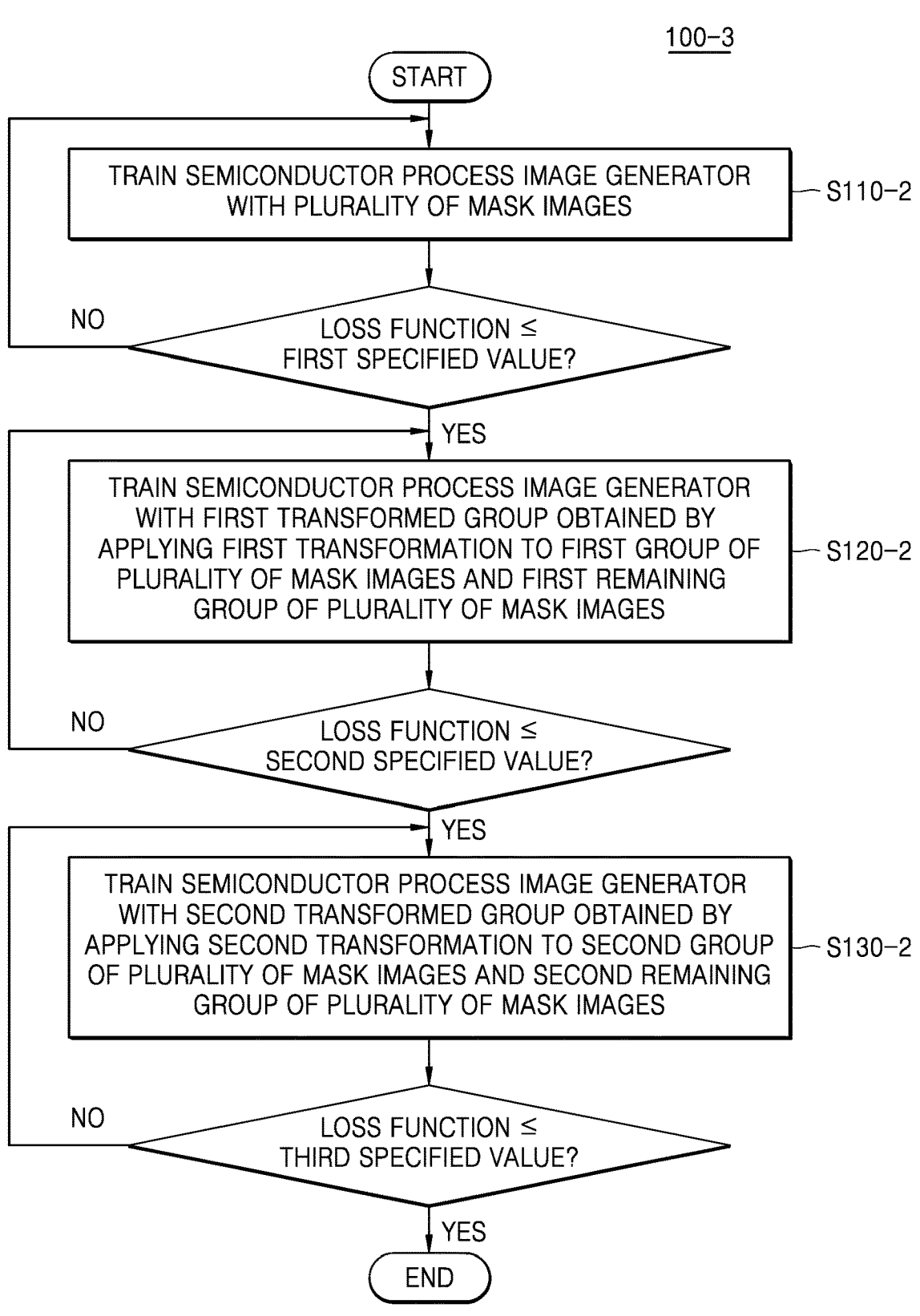
FIG. 8 is a flowchart illustrating a method of training a semiconductor process image generator, according to an embodiment of the inventive concept.

FIG. 8 is a flowchart illustrating a method 100-3 of training a semiconductor process image generator, according to an embodiment of the inventive concept. A difference between the method 100-2 of training a semiconductor process image generator illustrated in FIG. 6 and the method 100-3 of training a semiconductor process image generator illustrated in FIG. 8 is described below.

Referring to FIGS. 8 and 7, a semiconductor process image generator may be trained with the first to fifth mask images MI1 to MI5 (S110-2). Operation S110-2 for training a semiconductor process image generator with the first to fifth mask images MI1 to MI5 may be repeated until a loss function of the semiconductor process image generator is less than or equal to a first value.

A semiconductor process image generator may be trained with the first transformed group G1a and the first remaining group G1r (S120-2). Operation S120-2 for training the semiconductor process image generator with the first transformed group G1a and the first remaining group G1r may be repeated until a loss function of the semiconductor process image generator is less than or equal to a second value.

A semiconductor process image generator may be trained with the second transformed group G2b and the second remaining group G2r (S130-2). Operation S130-2 for training the semiconductor process image generator with the second transformed group G2b and the second remaining group G2r may be repeated until a loss function of the semiconductor process image generator is less than or equal to a third value.

The second value may be less than or equal to the first value. The third value may be less than or equal to the second value. For example, the second value may be less than the first value, and the third value may be less than the second value.

Figure 10A:
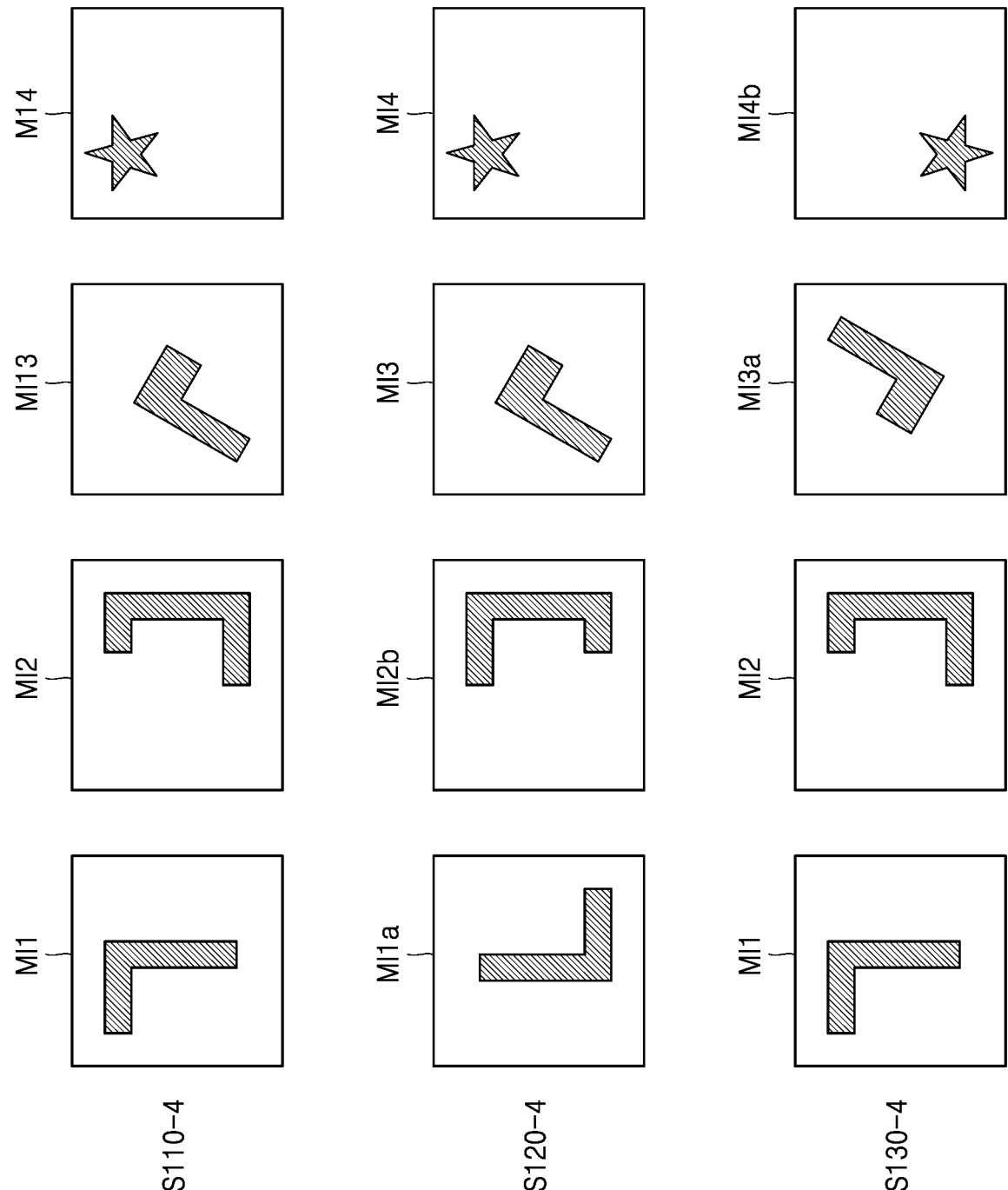
FIG. 10A illustrates a method of training a semiconductor process image generator, according to an embodiment of the inventive concept.
Figure 10B:
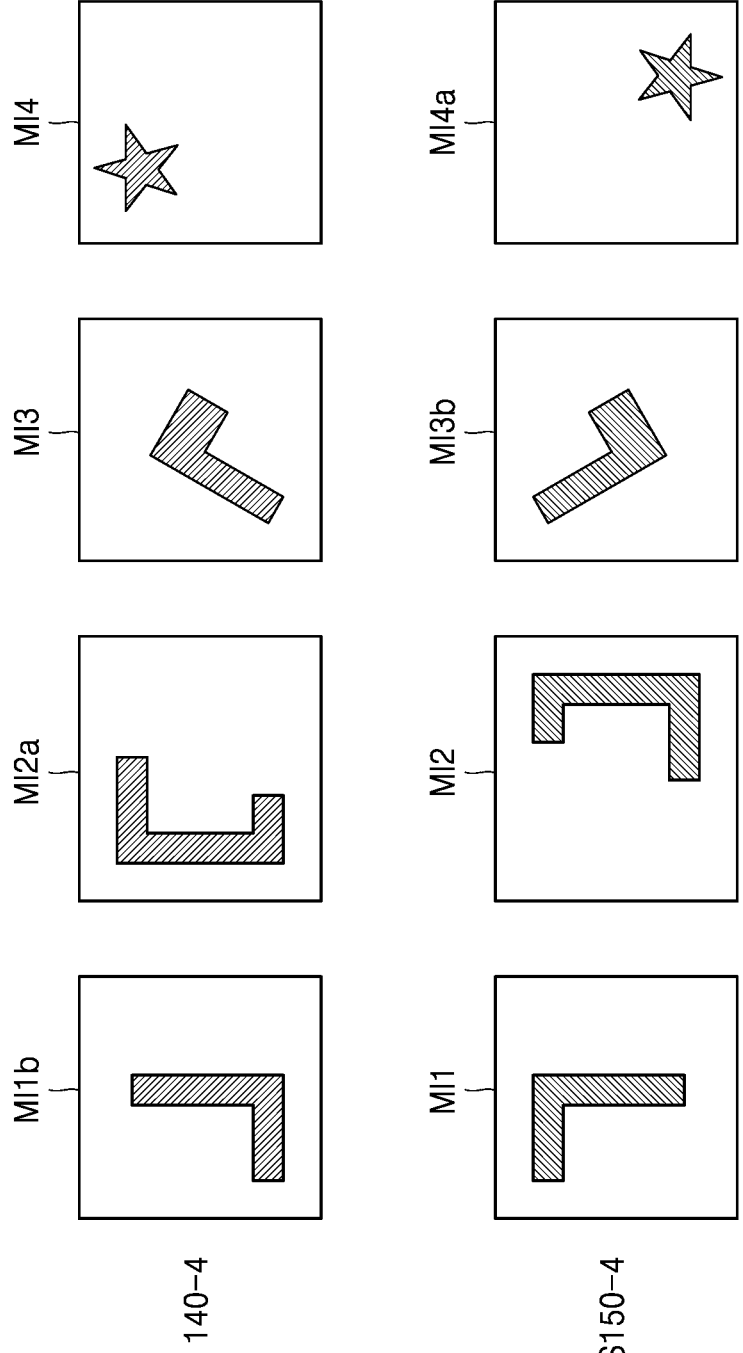
FIG. 10B illustrates a method of training a semiconductor process image generator, according to an embodiment of the inventive concept.

FIG. 9 is a flowchart illustrating a method 100-4 of training a semiconductor process image generator, according to an embodiment of the inventive concept. FIG. 10A illustrates the method 100-4 of training a semiconductor process image generator, according to an embodiment of the inventive concept. FIG. 10B illustrates the method 100-4 of training a semiconductor process image generator, according to an embodiment of the inventive concept.

Referring to FIGS. 9, 10A, and 10B, a semiconductor process image generator may be trained with the first to fourth mask images MI1 to MI4 (S110-4).

Next, the semiconductor process image generator may be trained with a first transformed mask image MI1a obtained by applying a first transform, for example, a 180 degree rotation transform, to the first mask image MI1, a second transformed mask image MI2b obtained by applying a second transform, for example, the X-axis symmetry transformation, to the second mask image MI2, and the third and fourth mask images MI3 and MI4 (S120-4).

Next, a semiconductor process image generator may be trained with a third transformed mask image MI3a obtained by applying a first transform, for example, a 180 degree rotation transform, to the third mask image MI3, a fourth transformed mask image MI4b obtained by applying a second transform, for example, the X-axis symmetry transformation, to the fourth mask image MI4, and the first and second mask images MI1 and MI2 (S130-4).

Next, a semiconductor process image generator may be trained with the fifth transformed mask image MI1b obtained by applying a second transformation, for example, an X-axis symmetry transformation, to the first mask image MI1, the sixth transformed mask image MI2a obtained by applying a first transformation, for example, the 180 degree rotation, to the second mask image MI2, and the third and fourth mask images MI3 and MI4 (S140-4).

Next, a semiconductor process image generator may be trained with the seventh transformed mask image MI3b obtained by applying the second transformation, for example, the X-axis symmetry transformation, to the third mask image MI3, the eighth transformed mask image MI4a obtained by applying a first transformation, for example, the 180 degree rotation transformation, to the fourth mask image MI4, and the first and second mask images MI1 and MI2 (S150-4).

Although FIGS. 10A and 10B illustrate that the first transformation is a 180 degree rotation transformation and the second transformation is an X-axis symmetry transformation, the transformations are examples and may be changed.

An operation for training a semiconductor process image generator with the first to fourth mask images MI1 to MI4 may be repeated n1 times. In addition, an operation for training a semiconductor process image generator with the first and second transformed mask images MI1a and MI2b and the third and fourth mask images MI3 and MI4 may be repeated n2 times. In addition, an operation for training a semiconductor process image generator with the third and fourth transformed mask images MI3a and MI4b may be repeated n3 times. In addition, an operation for training a semiconductor process image generator with the sixth and seventh transformed mask images MI1b and MI2a may be repeated n4 times. In addition, an operation for training a semiconductor process image with the seventh and eighth transformed mask images MI3b and MI4a and the first and second mask images MI1 and MI2 may be repeated n5 times. In some embodiments, n2 may be less than or equal to n1, n3 may be less than or equal to n1, n4 may be less than or equal to n1, and n5 may be less than or equal to n1. In some embodiments, n2, n3, n4, and n5 may be equal to each other. In some embodiments, n2, n3, n4, and n5 may be different from each other. For example, n2 may be equal to n3, n4 may be equal to n5, and n4 may be less than n2. In other embodiments, n2, n3, n4, and n5 may be all different from each other. It should be understood that n1, n2, n3, n4, and n5 are natural numbers.

FIG. 11 is a flowchart illustrating a method 100-5 of training a semiconductor process image generator, according to an embodiment of the inventive concept. A difference between the method 100-4 of training a semiconductor process image generator illustrated in FIG. 9 and the method 100-5 of training a semiconductor process image generator illustrated in FIG. 11 is described below.

Referring to FIG. 11, a semiconductor process image generator may be trained with the first to fourth mask images MI1 to MI4 (S110-4). Operation S110-4 for training a semiconductor process image generator with the first to fourth mask images MI1 to MI4 may be repeated until a loss function of the semiconductor process image generator is less than or equal to a first value.

Next, a semiconductor process image generator may be trained with the first transformed mask image MI1a obtained by applying a first transform, for example, a 180 degree rotation transform, to the first mask image MI1, the second transformed mask image MI2b obtained by applying a second transform, for example, the X-axis symmetry transformation, to the second mask image MI2, and the third and fourth mask images MI3 and MI4 (S120-4). Operation S120-4 for training the semiconductor process image generator with the first and second transformed mask images MI1a and MI2b and the third and fourth mask images MI3 and MI4 may be repeated until a loss function of the semiconductor process image generator is less than or equal to the second value.

Next, a semiconductor process image generator may be trained with the third transformed mask image MI3a obtained by applying a first transform, for example, a 180 degree rotation transform, to the third mask image MI3, the fourth transformed mask image MI4b obtained by applying a second transform to the fourth mask image MI4, and the first and second mask images MI1 and MI2 (S130-4). Operation S130-4 for training a semiconductor process image generator with the third and fourth transformed mask images MI3a and MI4b and the first and second mask images MI1 and MI2 may be repeated until a loss function of the semiconductor process image generator is less than or equal to a third value.

Next, a semiconductor process image generator may be trained with the fifth transformed mask image MI1b obtained by applying a second transformation, for example, an X-axis symmetry transformation, to the first mask image MI1, the sixth transformed mask image MI2a obtained by applying a first transformation, for example, the 180 degree rotation, to the second mask image MI2, and the third and fourth mask images MI3 and MI4 (S140-4). Operation S140-4 for training a semiconductor process image generator with the fifth and sixth transformed mask images MI1b and MI2a and the third and fourth mask images MI3 and MI4 may be repeated until a loss function of the semiconductor process image generator is less than or equal to a fourth value.

Next, a semiconductor process image generator may be trained with the seventh transformed mask image MI3b obtained by applying the second transformation, for example, the X-axis symmetry transformation, to the third mask image MI3, the eighth transformed mask image MI4a obtained by applying a first transformation, for example, the 180 degree rotation transformation, to the fourth mask image MI4, and the first and second mask images MI1 and MI2 (S150-4). Operation S150-4 for training a semiconductor process image generator with the seventh and eighth transformed mask images MI3b and MI4a may be repeated until a loss function of the semiconductor process image generator is less than or equal to a fifth value.

In some embodiments, the second value is less than or equal to the first value, the third value is less than or equal to the first value, the fourth value is less than or equal to the first value, and the fifth value is less than or equal to the first value. For example, the second value is less than the first value, the third value is less than the second value, the fourth value is less than the third value, and the fifth value is less than the fourth value.

Figure 12:
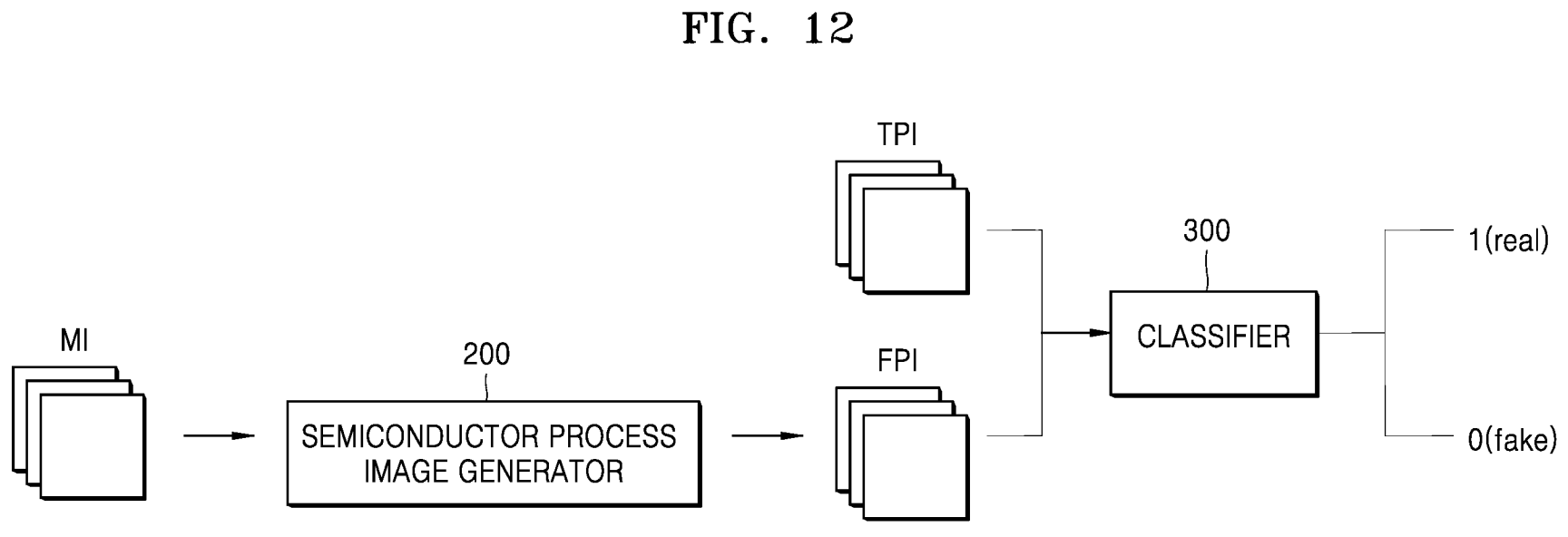

FIG. 12 illustrates an operation for training a semiconductor process image generator 200 with a plurality of mask images MI.

Referring to FIG. 12, the semiconductor process image generator 200 may generate a plurality of semiconductor process images FPI generated from the plurality of mask images MI. The plurality of semiconductor process images FPI may also be referred to as a plurality of fake semiconductor process images. A classifier 300 may receive the plurality of fake semiconductor process images FPI. The classifier 300 may further receive a plurality of actual semiconductor process images TPI obtained by imaging a real semiconductor process result. The classifier 300 may classify the plurality of fake semiconductor process images FPI and the plurality of real semiconductor process images TPI into real images and fake images.

A loss function of the semiconductor process image generator 200 may decrease when a probability that the classifier 300 incorrectly classifies the plurality of fake semiconductor process images FPI as real images increases. For example, the loss function of the semiconductor process image generator 200 may be represented by Equation 1 below.

$$L_G = E[\log(1 - D(G(MI)))] \qquad \text{Equation 1}$$

Here, E is an expected value, and D(G(MI)) is a probability that the classifier 300 incorrectly classifies the plurality of fake semiconductor process images FPI generated by the semiconductor process image generator 200 as real (1) images. A loss function $L_G$ of the semiconductor process image generator 200 decreases when a probability (D(G(MI))) that the plurality of semiconductor process images FPI are incorrectly classified as real (1) images increases.

The loss function of the classifier 300 may decrease when a probability that the classifier 300 correctly classifies the plurality of real semiconductor process images TPI as real images increases. In addition, the loss function of the classifier 300 may decrease when a probability that the classifier 300 correctly classifies the plurality of fake semiconductor process images FPI as fake images is increased. The loss function of the classifier 300 may be represented by Equation 2 below.

$$L_D = -E[\log D(TPI)] - E[\log\{1 - D(G(MI))\}] \qquad \text{Equation 2}$$

Here, E is an expected value, and D(TPI) is a probability that the classifier 300 correctly classifies the plurality of real semiconductor process images TPI as real (1) images. D(G(MI)) is a probability that the classifier 300 incorrectly classifies the plurality of fake semiconductor process images FPI generated by the semiconductor process image generator 200 as real (1) images. Therefore, 1-D(FPI) is a probability that the classifier 300 correctly classifies the plurality of fake semiconductor process images FPI generated by the semiconductor process image generator 200 as fake (0) images.

Weight values of the semiconductor process image generator 200 may be updated to reduce the loss function $L_G$ of the semiconductor process image generator 200, and weight values of the classifier 300 may be updated to reduce the loss function $L_D$ of the classifier 300. The loss function of the semiconductor process image generator 200 and the loss function of the classifier 300 are not limited by Equation 1 and Equation 2, and various known loss functions may be used therefor.

In some embodiments, the semiconductor process image generator 200 may include a plurality of convolution layers. In some embodiments, the classifier 300 may include a plurality of convolution layers. In some embodiments, the semiconductor process image generator 200 and the classifier 300 may each form a deep convolutional generative adversarial network (DCGAN).

While the inventive concept has been particularly shown and described with reference to embodiments thereof, it will be understood that various changes in form and details may be made therein without departing from the spirit and scope of the following claims.

What is claimed is:

1. A method of training a semiconductor process image generator, the method comprising:
    training the semiconductor process image generator with a plurality of mask images including a first group and a second group, during a first time period;
    training the semiconductor process image generator with the second group and a first transformed group obtained by applying a transformation to the first group, during a second time period that is different from the first time period; and
    training the semiconductor process image generator with the first group and a second transformed group obtained by applying a transformation to the second group, during a third time period that is different from the first time period and the second time period.

2. The method of claim 1, wherein the transformation includes one of a rotation transformation, a symmetry transformation, and a combination of the rotation transformation and the symmetry transformation.

3. The method of claim 1, wherein
    the training of the semiconductor process image generator with the plurality of mask images is repeated n1 times,
    the training of the semiconductor process image generator with the first transformed group and the second group is repeated n2 times, and
    n2 is less than or equal to n1.

4. The method of claim 3, wherein
    the training of the semiconductor process image generator with the second transformed group and the first group is repeated n3 times, and
    n3 is less than or equal to n1.

5. The method of claim 1, wherein
    the training of the semiconductor process image generator with the plurality of mask images is repeated until a loss function of the semiconductor process image generator is less than or equal to a first value,
    the training of the semiconductor process image generator with the first transformed group and the second group is repeated until the loss function of the semiconductor process image generator is less than or equal to a second value, and
    the second value is less than or equal to the first value.

6. The method of claim 5, wherein
    the training of the semiconductor process image generator with the second transformed group and the first group is repeated until the loss function of the semiconductor process image generator is less than or equal to a third value, and
    the third value is less than or equal to the first value.

7. The method of claim 1, wherein the semiconductor process image generator comprises a plurality of convolution layers.

8. A method of training a semiconductor process image generator, the method comprising:
    training the semiconductor process image generator with a first mask image and a second mast image, during a first time period;

transforming the first mask image to obtain a third mask image;
    training the semiconductor process image generator with the second mask image and the third mask image, during a second time period following the first time period;
    transforming the second mask image to obtain a fourth mask image; and
    training the semiconductor process image generator with the first mask image and the fourth mask image, during a third time period following the second time period.

9. The method of claim 8, wherein the first mask image is transformed by a rotation transformation.

10. The method of claim 8, wherein the first mask image is transformed by a symmetry transformation.

11. The method of claim 8, wherein the first mask image is transformed by a 90 degree rotation transformation.

12. The method of claim 8, wherein the first mask image is transformed by a 180 degree rotation transformation.

13. The method of claim 8, further comprising repeating the training the semiconductor process image generator with the first mask image and the second mast image, during a fourth time period that is different from the first time period, the second time period and the third time period.

14. A method of training a semiconductor process image generator, the method comprising:
    training the semiconductor process image generator with a first group and a second group, during a first time period, the first group including a first mask image and a second mask image, the second group including a third mask image and a fourth mask image;
    transforming the first mask image to obtain a first transformed mask image, and transforming the second mask image to obtain a second transformed mask image;
    training the semiconductor process image generator with the third mask image, the fourth mask image, the first transformed mask image and the second transformed mask image, during a second time period that is different from the first time period;
    transforming the third mask image to obtain a third transformed mask image, and transforming the fourth mask image to obtain a fourth transformed mask image; and
    training the semiconductor process image generator with the first mask image, the second mask image, the third transformed mask image and the fourth transformed mask image, during a third time period that is different from the first time period and the second time period.

15. The method of claim 14, wherein the first mask image and the second mask image are transformed by a rotation transformation.

16. The method of claim 14, wherein the first mask image and the second mask image are transformed by a symmetry transformation.

17. The method of claim 14, wherein the first mask image and the second mask image are transformed by a 90 degree rotation transformation.

18. The method of claim 14, wherein the first mask image and the second mask image are transformed by a 180 degree rotation transformation.

19. The method of claim 14, further comprising repeating the training the semiconductor process image generator with the first group and the second group, during a fourth time period that is different from the first time period, the second time period and the third time period.

20. The method of claim 14, further comprising randomly selecting the first mask image and the second mask image among a plurality of mask images to form the first group.

\* \* \* \* \*